(12) United States Patent
Dazai et al.

(10) Patent No.: US 7,146,936 B2
(45) Date of Patent: Dec. 12, 2006

(54) METHOD AND APPARATUS FOR ANIMAL POSITIONING

(75) Inventors: Jun Dazai, Ontario (CA); Josette Chen, Ontario (CA); Nicholas Bock, Ontario (CA); Lorinda Davidson, Ontario (CA)

(73) Assignee: The Hospital for Sick Children, Toronto (CA)

( * ) Notice: Subject to any disclaimer, the term of this patent is extended or adjusted under 35 U.S.C. 154(b) by 0 days.

(21) Appl. No.: 10/887,200

(22) Filed: Jul. 8, 2004

(65) Prior Publication Data

US 2005/0056234 A1  Mar. 17, 2005

Related U.S. Application Data

(60) Provisional application No. 60/485,727, filed on Jul. 10, 2003.

(51) Int. Cl.
*A01K 29/00* (2006.01)
*B29C 33/40* (2006.01)

(52) U.S. Cl. .................... 119/756; 119/417; 119/751

(58) Field of Classification Search .............. 119/756, 119/417, 418, 421, 755, 751, 757; 5/625, 5/627, 621, 622, 623, 624, 630; 128/869, 128/870
See application file for complete search history.

(56) References Cited

U.S. PATENT DOCUMENTS

| | | | | |
|---|---|---|---|---|
| 2,540,650 A * | 2/1951 | Brosene, Jr. et al. | ....... | 119/751 |
| 2,987,042 A * | 6/1961 | Rothberg | ............. | 119/755 |
| 3,023,734 A * | 3/1962 | Schaub | ............. | 119/729 |
| 3,137,273 A * | 6/1964 | Greenwood | ............. | 119/754 |
| 3,138,141 A * | 6/1964 | Poage | ............. | 119/751 |
| 3,464,392 A * | 9/1969 | Hoyme et al. | ............. | 119/751 |
| 3,469,268 A * | 9/1969 | Phillips | ............. | 602/19 |
| 3,606,885 A * | 9/1971 | Lund | ............. | 128/870 |
| 3,625,185 A * | 12/1971 | Kester | ............. | 119/58 |
| 3,739,751 A * | 6/1973 | Mohr et al. | ............. | 119/752 |
| 3,933,154 A * | 1/1976 | Cabansag | ............. | 128/870 |
| 3,973,522 A * | 8/1976 | Rosow | ............. | 119/756 |
| 4,003,341 A * | 1/1977 | La Croix | ............. | 119/756 |
| 4,184,451 A * | 1/1980 | Carlin | ............. | 119/755 |
| 4,269,149 A * | 5/1981 | Thomas | ............. | 119/729 |
| 4,308,638 A * | 1/1982 | Senussi | ............. | 452/54 |
| D277,132 S * | 1/1985 | Hayashi et al. | ............. | D24/165 |
| 4,866,998 A * | 9/1989 | Stewart et al. | ............. | 73/866.5 |
| 4,979,520 A * | 12/1990 | Boone et al. | ............. | 128/870 |
| 5,167,160 A * | 12/1992 | Hall, II | ............. | 73/864.91 |
| 5,211,185 A * | 5/1993 | Garth et al. | ............. | 5/628 |
| 5,218,928 A * | 6/1993 | Muck et al. | ............. | 119/714 |
| 5,320,069 A * | 6/1994 | Anderson et al. | ............. | 119/751 |
| 5,626,151 A * | 5/1997 | Linden | ............. | 128/897 |
| D379,784 S * | 6/1997 | Muhanna et al. | ............. | D12/128 |
| 5,816,197 A * | 10/1998 | DeStefano et al. | ............. | 119/712 |

(Continued)

OTHER PUBLICATIONS

E-resp™ Cradle, SA Instruments, Inc.

*Primary Examiner*—Yvonne R. Abbott
(74) *Attorney, Agent, or Firm*—Tarolli, Sundheim, Covell & Tummino LLP

(57) ABSTRACT

An animal positioning apparatus including a support stretcher having a main body support portion. A head support portion is fixed to a first end of the main body support portion and forward limb directing means are provided proximal the first end of the main body support portion. Rear limb directing means are also provided proximal a second end of the main body support portion.

9 Claims, 8 Drawing Sheets

U.S. PATENT DOCUMENTS

| | | | |
|---|---|---|---|
| 5,839,393 A * | 11/1998 | Rupp et al. | 119/712 |
| 5,927,234 A * | 7/1999 | Siegel | 119/751 |
| 5,950,627 A * | 9/1999 | Bologovsky et al. | 128/869 |
| 5,975,081 A * | 11/1999 | Hood et al. | 128/845 |
| 6,062,224 A * | 5/2000 | Kissinger et al. | 128/897 |
| 6,279,511 B1 * | 8/2001 | Loughnane | 119/769 |
| 6,293,918 B1 * | 9/2001 | Wang | 602/20 |
| 6,443,918 B1 * | 9/2002 | Wang | 602/5 |
| 6,446,579 B1 * | 9/2002 | Griebling | 119/751 |
| 6,549,799 B1 | 4/2003 | Bock et al. | |
| 6,675,741 B1 * | 1/2004 | Remmler | 119/755 |
| 6,789,510 B1 * | 9/2004 | Lee | 119/811 |
| 6,851,392 B1 * | 2/2005 | Zan et al. | 119/756 |
| 6,880,487 B1 * | 4/2005 | Reinkensmeyer et al. | 119/700 |
| 2002/0112672 A1 * | 8/2002 | Schafhalter | 119/417 |
| 2003/0024482 A1 * | 2/2003 | Gondhalekar et al. | 119/417 |
| 2003/0111021 A1 * | 6/2003 | Lee | 119/417 |
| 2003/0229312 A1 * | 12/2003 | Smith et al. | 604/152 |
| 2006/0102091 A1 * | 5/2006 | Kissinger | 119/417 |

* cited by examiner

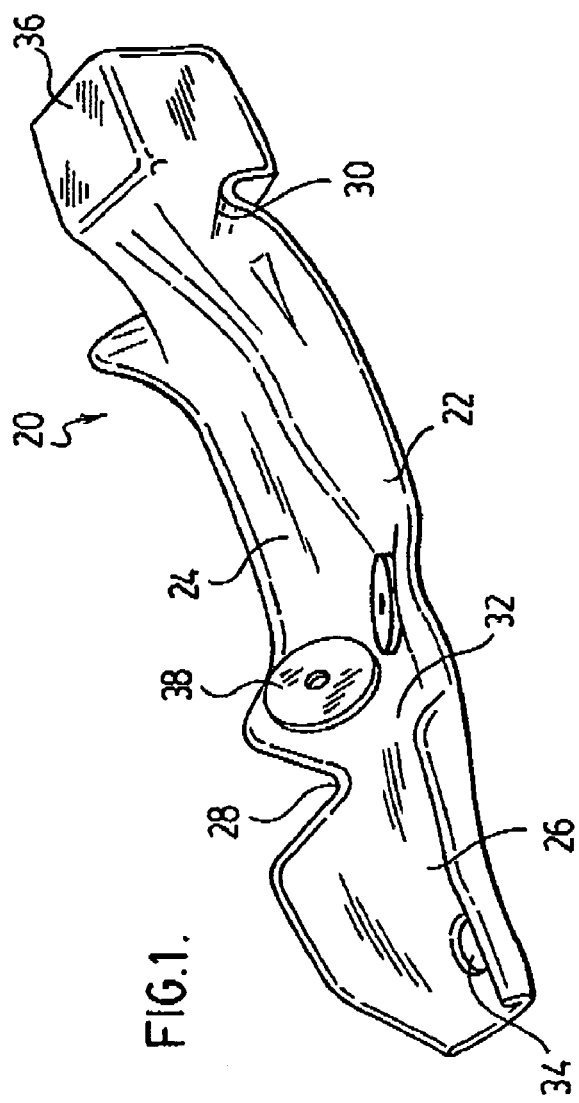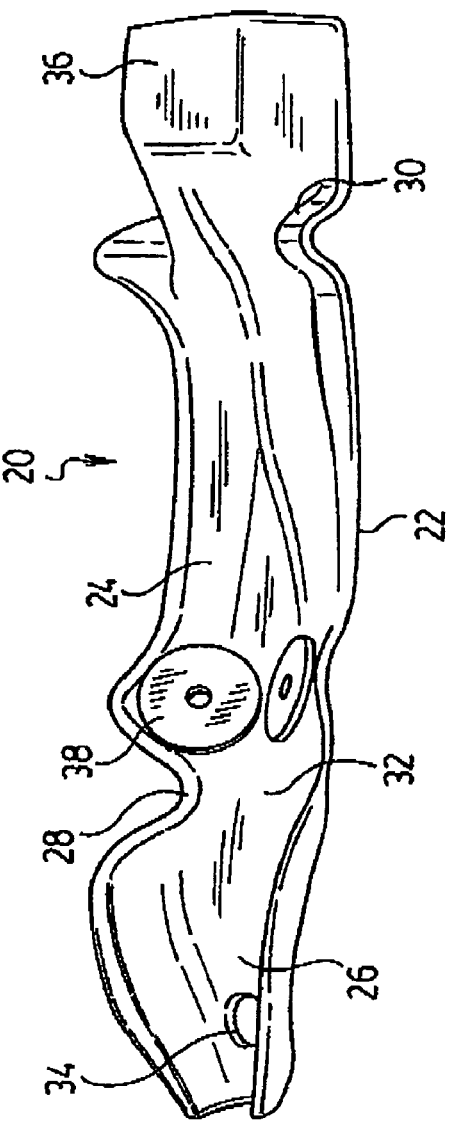

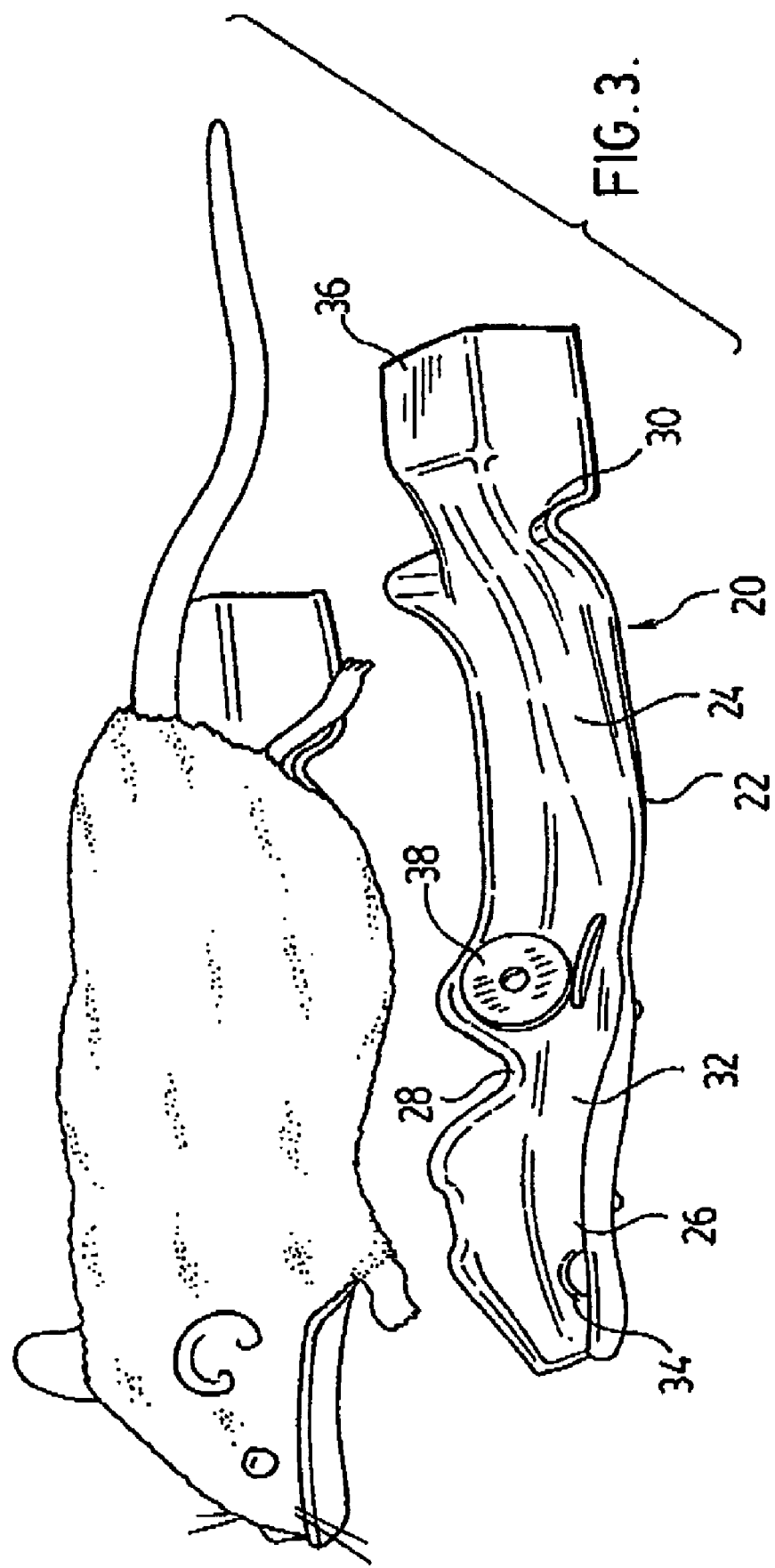

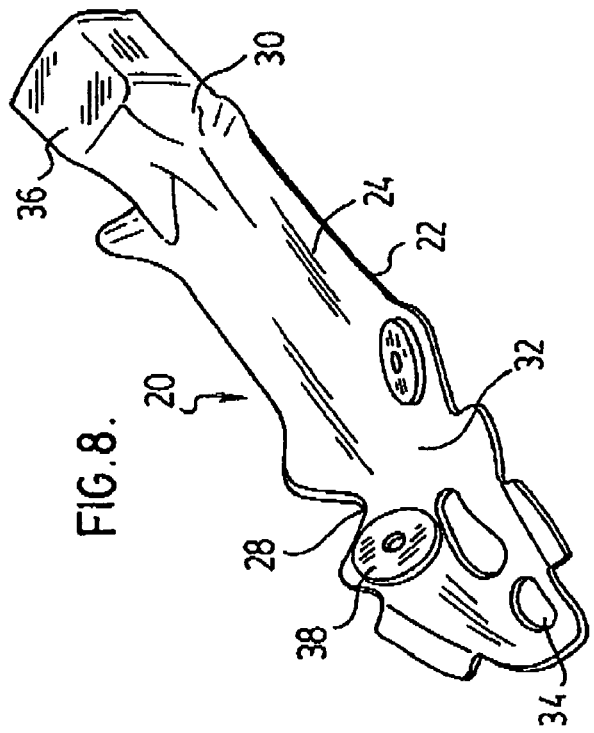
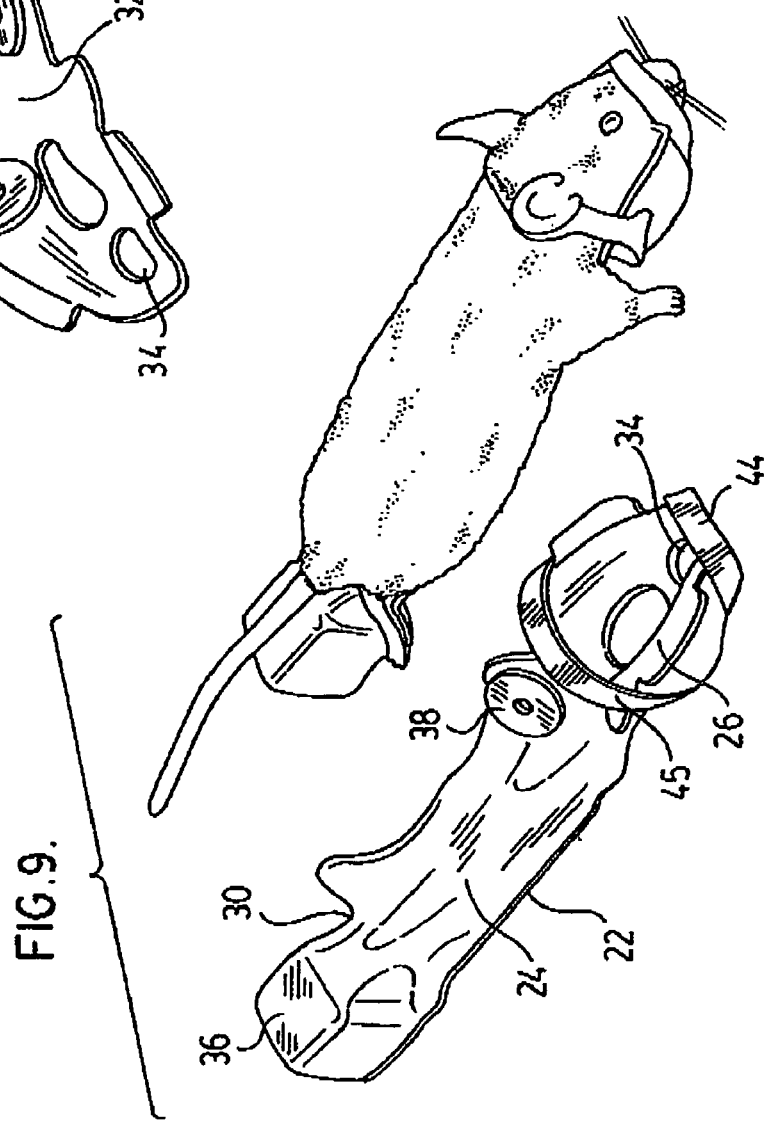

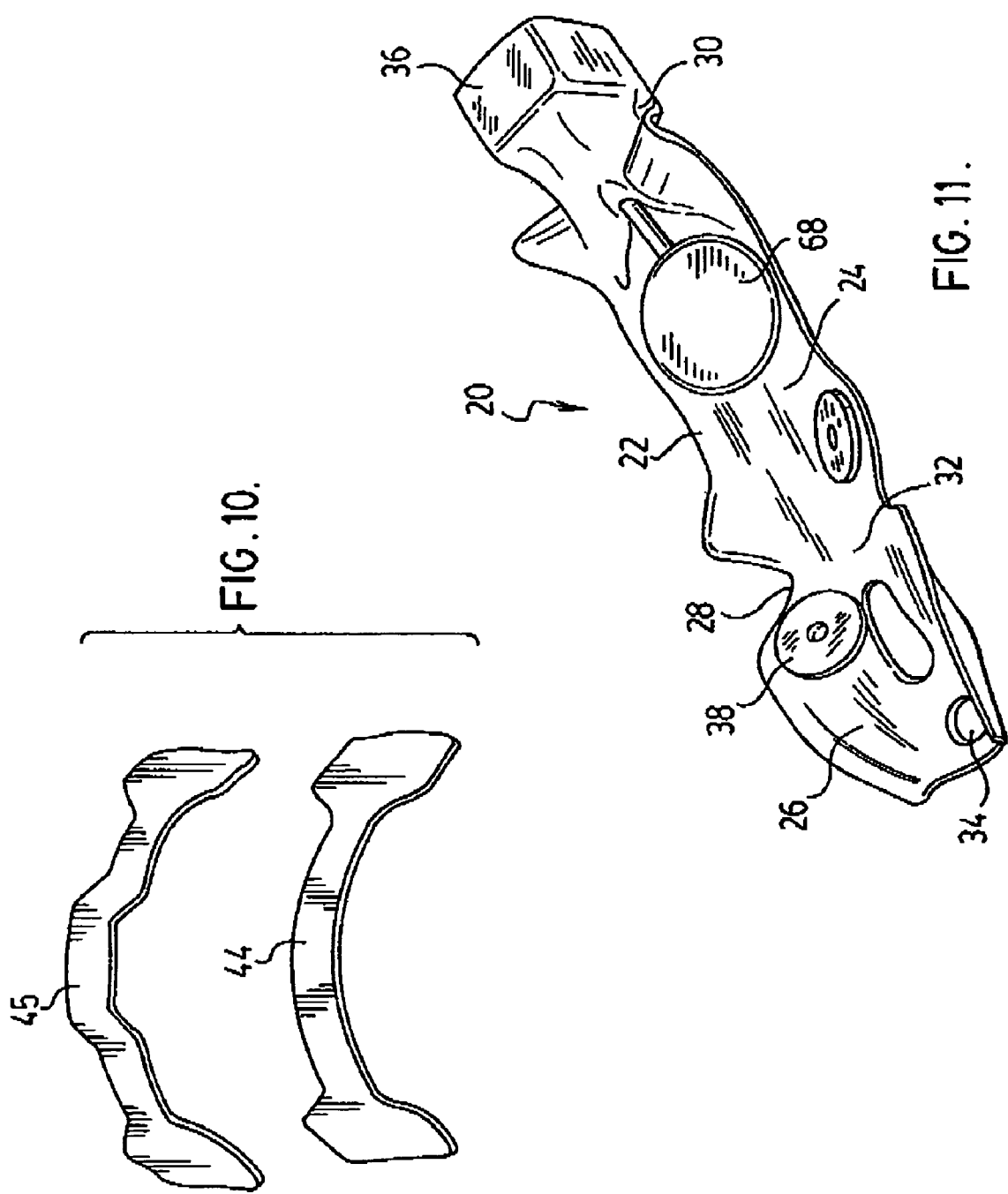

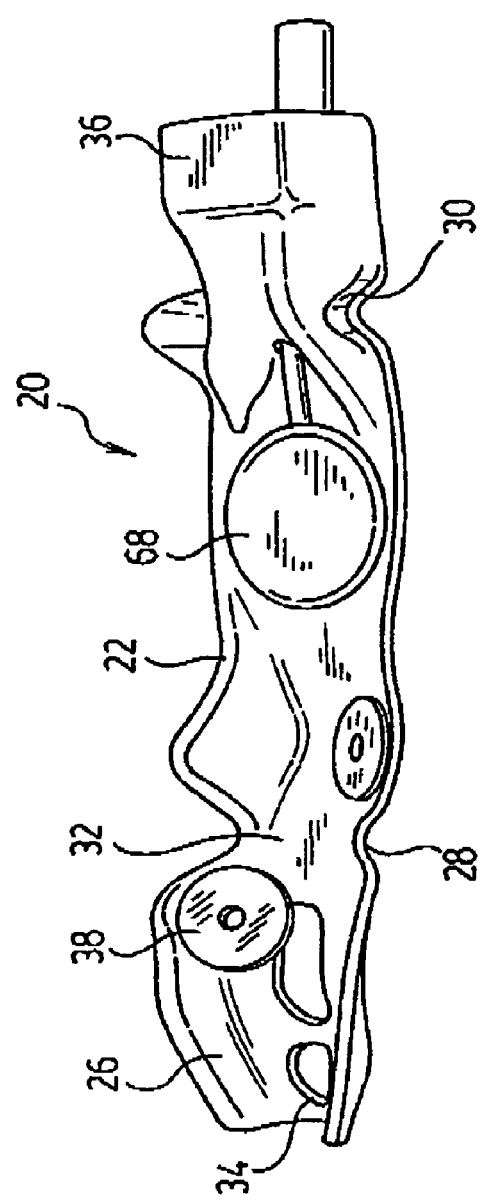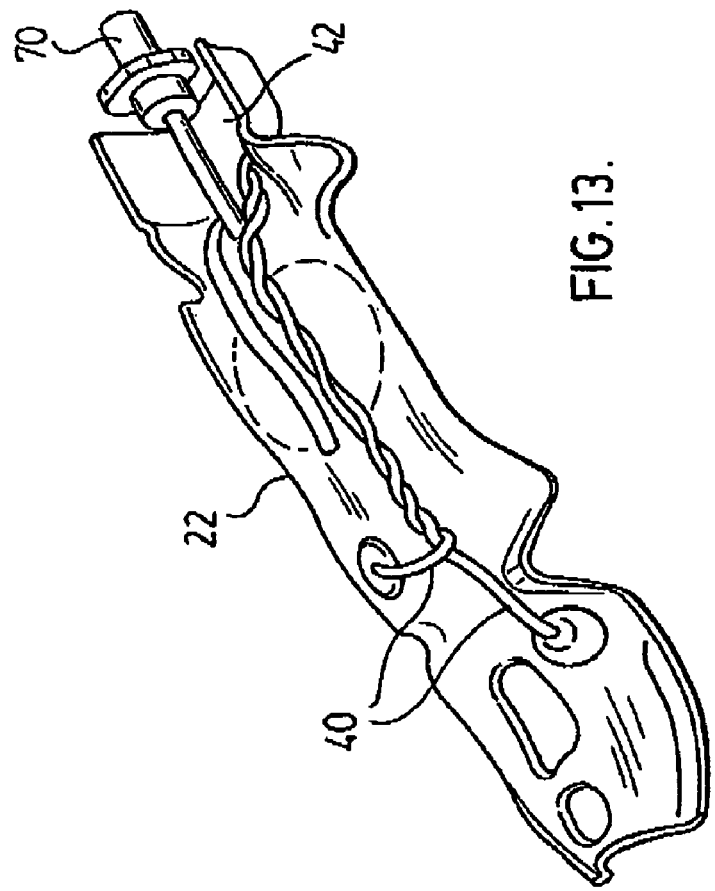

METHOD AND APPARATUS FOR ANIMAL POSITIONING

RELATED APPLICATION

This application claims priority from U.S. provisional patent application Ser. No. 60/485,727, filed on Jul. 10, 2003. The subject matter of the above-listed provisional patent application is incorporated herein by reference.

FIELD OF THE INVENTION

This invention relates to the research using small animal specimens and more particularly to a reusable positioning apparatus for use in research including, for example, imaging of animals.

BACKGROUND OF THE INVENTION

Small animal imaging is increasingly used in research and modeling of human disease. With this increase in small animal imaging, more and more small animals are processed. When imaging live specimens, such as mice, rats, guinea pigs, rabbits, pigs, etc., the physiology of the animal, such as the heart rate and temperature of the animal, is commonly monitored. To monitor the physiology of the animal, probes are secured to the animal. For example, electrocardiogram (ECG) probes are commonly secured to the animals' limbs. Unfortunately, these probes can be time consuming to position and attach to the animal. Also, the body position of the animal can have a significant effect on certain measured results. Moreover, measurement and imaging of the same animal is often repeated throughout the life of the animal in order to track changes such as tumor growth. Comparative and computer-aided image processing algorithms can also be used in tracking such changes. The repeatability of positioning of the animal is important when using such computer-aided image processing. Thus, it is desirable to consistently position the animals in identical positions for imaging and measurement.

Preparation of individual animals involves awkward and time-consuming work for the application of electrodes and temperature probes. Due to the size of some small animals, such as mice, this work is especially difficult and time-consuming. There are several different types of harnesses and jackets available for incorporating ECG probes. None of these devices, however, include a temperature measurement probe nor do they provide standardized positioning for the animals.

One example of a device that is used for holding a small animal, is an E-resp™ cradle available from SA Instruments, Inc, 65 Main Street, Stony Brook N.Y., 11790 (http://i4sa.com/newproducts.shtml). This device provides a holder for a mouse during testing. However, this cradle does not provide standardized positioning as only the main body portion of the mouse is supported. Also, ECG electrodes must still be attached to the limbs of the mouse, and there is no provision for monitoring the temperature of the mouse.

Another example of a device for holding a small animal is the Model 900M MRI, small animal stereotaxic instrument, available from David Kopf Instruments, 7324 Elmo Street, Tujunga Calif., 91042 (http://kopfinstruments.com/Stereotaxic/900M.htm). This device is a stereotaxic frame for stabilizing the head of the small animal, such as a rat, by inserting bars into the ears of the rat and thereby inhibiting movement of the rat's head. Clearly, this device stabilizes only the head of the animal and fails to provide a standardized positioning for the remainder of the rat body. Also, this device does not provide ECG electrodes or a thermocouple for monitoring the temperature of the rat.

Recent advances in MRI technology have allowed for the study of a number of small animals at one time, in a single MRI. For example, U.S. Pat. No. 6,549,797 to Bock et al., issued Apr. 15, 2003, the entire content of which is incorporated herein by reference, discloses a method and apparatus for simultaneous imaging of a plurality of objects using a common magnet. In the apparatus disclosed by Bock, sixteen mice are imaged concurrently. Thus, there is a clear need for efficient preparation of each animal.

Accordingly, it is an object of an aspect of the present invention to provide an animal positioning apparatus that obviates or mitigates at least some of the disadvantages of the prior art.

SUMMARY OF THE INVENTION

In one aspect of the present invention, there is provided an animal positioning apparatus. The apparatus includes a support stretcher having a main body support portion with opposing first and second ends. A head support portion is fixed to the first end of the main body support portion and forward limb directing means are provided proximal the first end of the main body support portion. Rear limb directing means are also provided proximal the second end of the main body support portion.

In another aspect of the present invention, there is provided a process for manufacturing an animal positioning apparatus. The process includes forming a first negative mold of the animal; casting a positive mold in the negative mold of the animal; and vacuum forming a plastic sheet around the positive mold.

Advantageously, the animal positioning apparatus provides standardized positioning for animals while maintaining animal comfort. The apparatus facilitates research by providing easily repeatable positioning with decreased animal preparation time when compared with prior art practices. Also, probes such as ECG probes and thermocouples are incorporated into the apparatus, thereby providing for repeatability of positioning with respect to the animal.

BRIEF DESCRIPTION OF THE DRAWINGS

The invention will be better understood with reference to the drawings and to the following description, in which:

FIG. 1 is a perspective view of a small animal positioning apparatus in accordance with an aspect of the present invention;

FIG. 2 is another perspective view of the small animal positioning apparatus of FIG. 1;

FIG. 3 is a perspective view of two of the small animal positioning apparatus of FIG. 1, one of the small animal positioning apparatus including a mouse positioned thereon;

FIG. 8 is a perspective view of a small animal positioning apparatus according to another embodiment of the present invention;

FIG. 9 is a perspective view of two of the small animal positioning apparatus of FIG. 8 including a pair of straps for restraining the animal, one of the small animal positioning apparatus including a mouse positioned thereon;

FIG. 10 is a perspective view of the straps of FIG. 9;

FIG. 11 is a perspective view of a small animal positioning apparatus according to still another embodiment of the present invention;

FIG. 12 is another perspective view of the small animal positioning apparatus of FIG. 11; and FIG. 13 is a perspective view of an underside of the small animal positioning apparatus of FIG. 1.

DETAILED DESCRIPTION OF THE PREFERRED EMBODIMENTS

Figure 4:
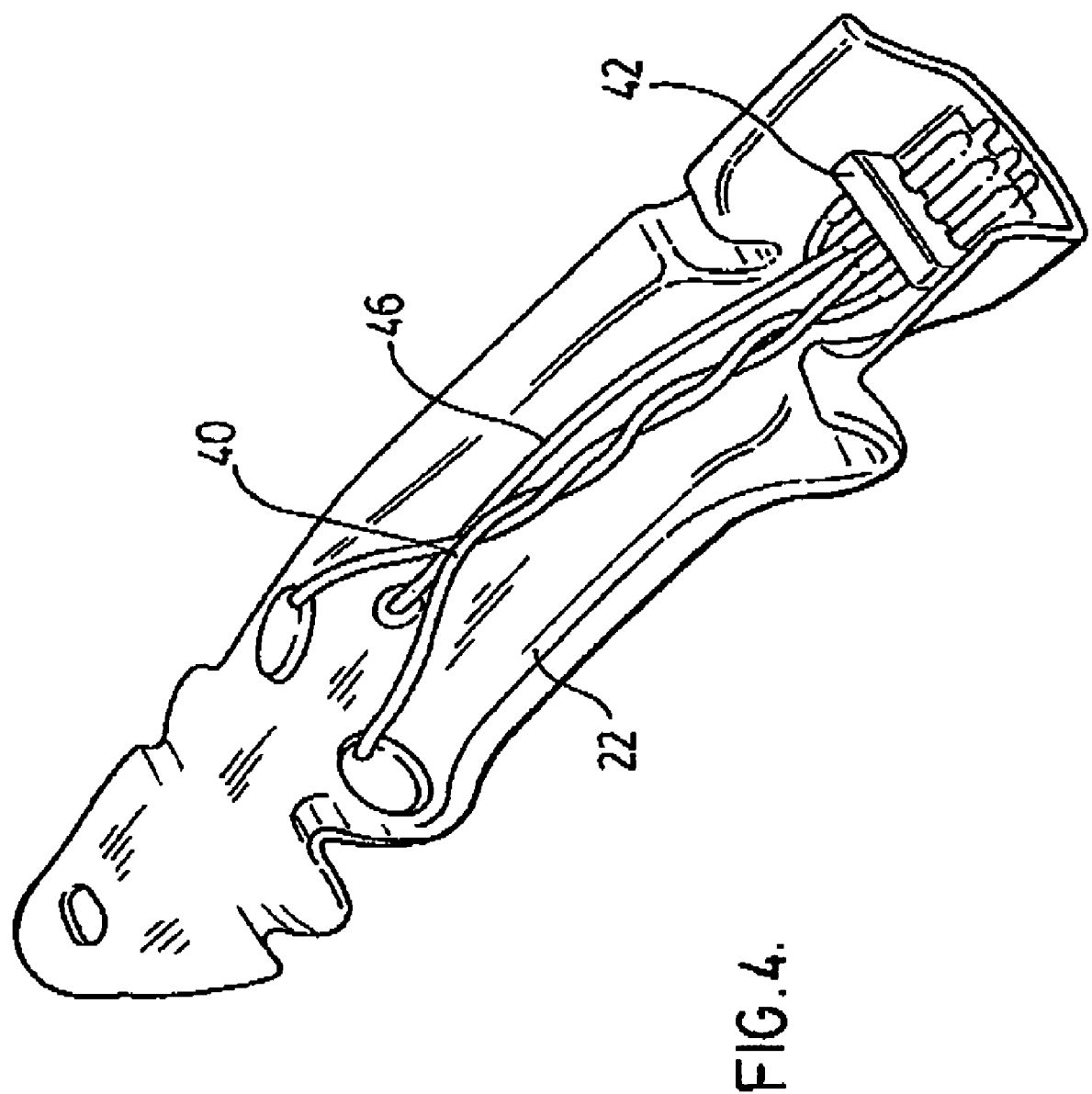
FIG. 4 is a perspective view of an underside of the small animal positioning apparatus of FIG. 1.

Reference is made to FIGS. 1 to 6 to describe an embodiment of an animal positioning apparatus designated generally by the numeral 20. While reference is made in particular to a mouse throughout the description, it will be understood that this is only one embodiment of the present invention, and that the present invention is not limited to mice and includes similar positioning apparatus for other animals. Thus, the present invention can be used for other animals such as different sized mice, rats, rabbits, guinea pigs, pigs, etc. The animal positioning apparatus 20 includes a support stretcher 22 having a main body support portion 24 with opposing first and second ends. A head support portion 26 is fixed to the first end of the main body support portion 24 and forward limb directing means 28 are provided proximal the first end of the main body support portion 24. Rear limb directing means 30 are provided proximal the second end of the main body support portion 24.

The animal positioning apparatus 20 will now be described in more detail. As shown in the Figures, the main body portion 24 is generally concave in shape and is sized and shaped to receive the body of a small animal. In the present embodiment, the main body portion 24 is sized and shaped to receive the body of a mouse such that the underside of the mouse is positioned on the generally concave surface of the main body portion 24. Clearly, different sizes of apparatus 20 are employed for different sized mice and different sized animals.

The head support portion 26 is also generally concave and is sized and shaped to receive the head of the mouse such that the underside of the chin of the mouse is positioned on the generally concave surface of the head support portion 26. The head support portion 26 is fixed to the main body support portion 24 by an intermediate neck 32 disposed between the head support portion 26 and the body support portion 24. The intermediate neck 32 includes a pair of notches that act as the forward limb directing means 28. Clearly these notches at the neck 32 are provided for receiving the forward limbs of the mouse. The head support portion 26 includes an aperture 34 to allow airflow proximal the mouth of the mouse and thereby allow the mouse to breathe.

An end connecting portion 36 is fixed to the second end of the main body support portion 24 of the apparatus 20, with a pair of rear limb directing recesses that act as the rear limb directing means 30, disposed between the main body support portion 24 and the end connecting portion 36. The end connecting portion 36 is a C-shaped section with the opening of C directed away from the tail of the mouse, when the mouse is positioned on the apparatus 20. The end connecting portion 36, the main body support portion 24 and the rear limb directing recesses 30 together form a saddle shape as best shown in FIGS. 1 to 6.

In the above description, the support stretcher 22 is described as including different portions, including the main body support portion 24, the head support portion 26, the forward limb directing means 28, the rear limb directing means 30 and the end connecting portion 36. It will be understood, however, that in the present embodiment, the stretcher 22 is a single unitary piece of molded plastic including each of these elements, as shown in FIGS. 1 to 12.

A pair of neonatal electrocardiogram (ECG) probe pads 38 are disposed on the main body support portion 24, proximal the first end thereof, for ECG monitoring of the mouse when the mouse is placed on the support stretcher 22. Clearly, the ECG probe pads are located such that the pads 38 contact the underside of the upper body of the mouse when the mouse is located on the stretcher 22. As best shown in FIG. 4, a pair of wires 40 are connected to the underside of the ECG probe pads, on the side of the pads opposite the side for contacting the upper body of the mouse. The wires 40 extend under the body support portion 24 of the stretcher 22, to the opening of the C-shaped section of the end connecting portion 36. The wires 40 are connected to a pin connector 42 in the end connecting portion 36. Clearly the pin connector 42 is provided for connection to an ECG, for monitoring the cardiac function of the mouse, when the apparatus 20 is in use.

Figure 5:
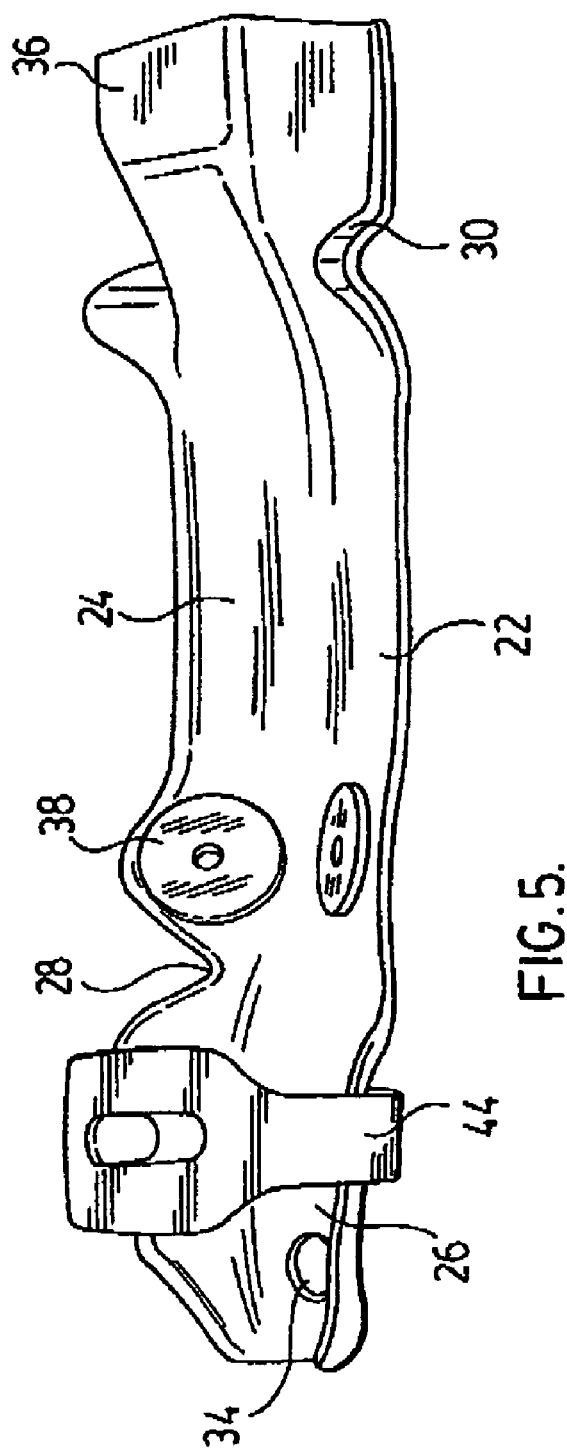
FIG. 5 is a perspective view of the small animal positioning apparatus of FIG. 1, including a strap for restraining an animal.
Figure 6:
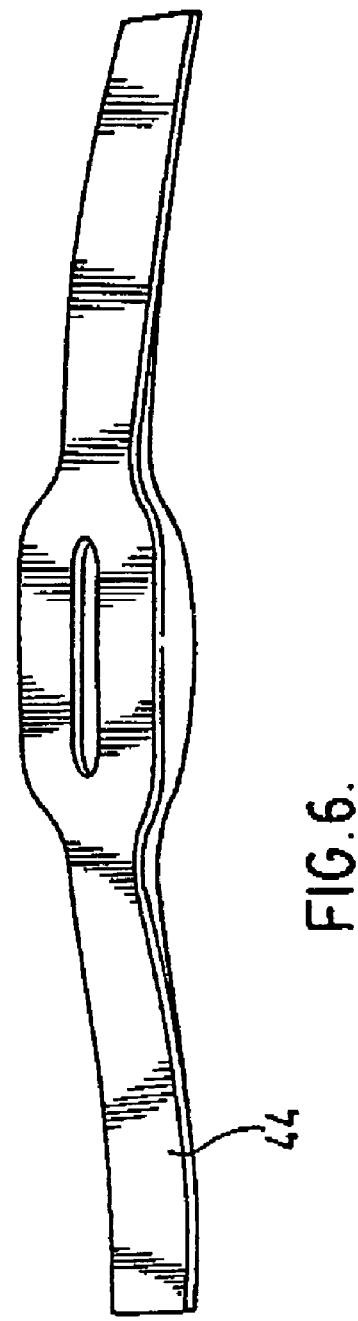
FIG. 6 is a perspective view of the strap of FIG. 5.
Figure 7:
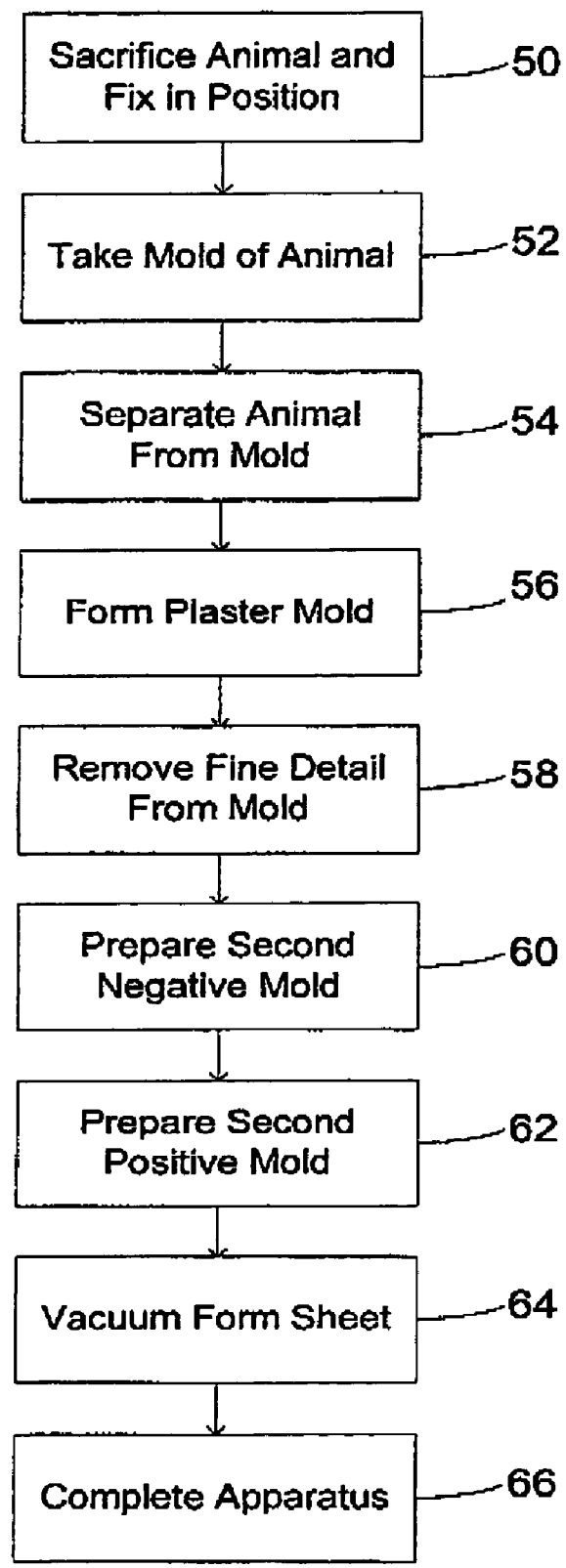
FIG. 7 is a flow chart showing a procedure for manufacturing the apparatus of FIG. 1.

Referring to FIGS. 5 and 6, a strap 44 made from a thin strip of hook and loop fastener material such as VELCRO™ is provided for restraining the mouse on the stretcher 22. The strap 44 is convenient for immobilizing the head, for example, by fixing the strap 44 around the head support portion 26 of the stretcher 22 and around the head of the subject mouse. If desired, other portions of the mouse are restrained using similar straps 44. Clearly, the strap 44 is sized to fit around the stretcher 22 and around the subject mouse.

In FIG. 4, a third wire is shown extending from approximately the center of the main body support portion 26, under the body support portion 24 of the stretcher 22, to the opening of the C-shaped section of the end connecting portion 36. The third wire is a thermocouple wire 46 and protrudes through the body support portion 24 of the stretcher to contact the skin of the mouse, when in use, for monitoring the skin temperature of the mouse. At the opposing end, the thermocouple wire 46 is connected to the pin connector 42, which provides a connection for monitoring the temperature of the mouse.

In use, the mouse is placed on the stretcher 22 such that the body of the mouse is located on the main body support portion 24 and the head of the mouse is located on the head support portion 26. The front limbs of the mouse are received in the notches that act as forward limb directing means 28 and direct the forward limbs away from the body of the mouse. The rear limbs of the mouse are received in the rear limb directing recesses 30 which direct the rear limbs of the mouse away from the body of the mouse. Thus, the ECG probe pads 38 and the end of the thermocouple wire 36 are in contact with the underside of the upper body of the mouse. The strap 44 is then secured around the head support portion 26 and around the head of the mouse, if desired. Clearly, the apparatus 20 provides for easy and repeatable positioning of the mouse.

When used in concurrent magnetic resonance imaging (MRI) of multiple objects, such as that disclosed in U.S. Pat. No. 6,549,799, the apparatus 20, including the mouse, is inserted into a common centrifuge tube for loading into position in a radio frequency (RF) coil in an array of RF coils. The pin connector 42 is then connected to leads of a monitoring system. Common centrifuge tubes include an open end and a tapered closed end. Prior to use, a hole is made in the tapered closed end of the centrifuge tube to allow for air flow proximal the mouth of the mouse.

A method of manufacture of the animal positioning device will now be described with reference to FIG. 8. First, an animal specimen is sacrificed and fixed in a favorable position (Step 50). This is achieved by freezing the animal in the favorable position. The sacrificed animal is then placed in a mold material such as vinylpolysiloxane (VPS) or common dental mold (Step 52), to form a negative mold of the animal. After sufficient hardening of the negative mold, the animal is removed from the mold material and the mold material is allowed to further harden thereby forming a negative mold. Next, plaster is mixed, poured into the negative mold and sufficient time is given to allow the plaster to harden thereby forming a positive plaster mold (Step 56). Fine detail is then removed from the positive plaster mold by, for example, grinding or sanding (Step 58). Grinding or sanding is carried out to remove fine details such as hair details and to provide a generic plaster mold of the animal. A second negative mold is formed by taking a negative mold of the positive plaster mold using a similar mold material as that used in Step 52 (Step 60). Next a second positive plaster mold is made by mixing and pouring plaster into the second negative mold (Step 62). A polypropylene sheet of suitable size is heated, placed around the second positive plaster mold and then placed in a vacuum, thereby vacuum forming the polypropylene sheet (Step 64). The vacuum formed polypropylene is then finished by drilling the aperture 34, embedding the neonatal ECG probe pads 38, adhering the pin connector 42 using a suitable adhesive, connecting the ECG probe pads 38 to the pin connector 42 using the wires 40, and embedding the thermocouple wire 46 and attaching to the pin connector 42 (Step 66).

Reference is now made to FIGS. 8 to 10 to describe an animal positioning apparatus 20 according to another embodiment of the present invention. Similar to the first described embodiment, the main body portion 24 is generally concave in shape and is sized and shaped to receive the body of a small animal such that the underside of the small animal is positioned on the generally concave surface of the main body portion 24. As in the above-described embodiment, different sizes of apparatus 20 are employed for different sized mice and different sized animals.

The head support portion 26 is also generally concave and is sized and shaped to receive the head of the mouse such that the underside of the chin of the mouse is positioned on the generally concave surface of the head support portion 26. The head support portion 26 is fixed to the main body support portion 24 by the intermediate neck 32 disposed between the head support portion 26 and the body support portion 24. The intermediate neck 32 includes a pair of notches that act as the forward limb directing means 28. These notches at the neck 32 are provided for receiving the forward limbs of the mouse. In the present embodiment, the head support portion 26 includes an aperture 34 to allow airflow proximal the mouth of the mouse and thereby allow the mouse to breathe. The head support portion 26 also includes a second aperture between the aperture 34 and the neck 32. The second aperture is provided for the comfort of the small animal.

As described above, an end connecting portion 36 is fixed to the second end of the main body support portion 24 of the apparatus 20, with a pair of rear limb directing recesses that act as the rear limb directing means 30, disposed between the main body support portion 24 and the end connecting portion 36. The end connecting portion 36 is a C-shaped section with the opening of C directed away from the tail of the mouse, when the mouse is positioned on the apparatus 20. The end connecting portion 36, the main body support portion 24 and the rear limb directing recesses 30 together form a saddle shape as best shown in FIG. 8.

As in the first described embodiment, the stretcher 22 is a single unitary piece of molded plastic including each of the main body support portion 24, the head support portion 26, the forward limb directing means 28, the rear limb directing means 30 and the end connecting portion 36.

The neonatal electrocardiogram (ECG) probe pads 38 in the present embodiment are not both disposed on the main body support portion 24. Instead, one is disposed on the main body support portion, proximal the first end thereof while the other is disposed on the head support portion 26, proximal the intermediate neck 32. As shown, the two neonatal ECG pads are provided proximal opposite edges of the stretcher 22 for ECG monitoring of the mouse when the mouse is placed on the support stretcher 22. The ECG probe pads are located such that the pads 38 contact the underside of the upper body and neck of the mouse when the mouse is located on the stretcher 22. As described above, a pair of wires 40 are connected to the underside of the ECG probe pads, on the side of the pads that is opposite the side that contacts the upper body of the mouse. The wires 40 extend under the body support portion 24 of the stretcher 22, to the opening of the C-shaped section of the end connecting portion 36. The wires 40 are connected to the pin connector 42 in the end connecting portion 36.

Referring to FIGS. 9 and 10, rather than a single strap 44 as in the first described embodiment, the present embodiment includes a pair of straps 44 and 45. The straps 44, 45 are made from a thin strip of hook and loop fastener material such as VELCRO™, are provided for restraining the mouse on the stretcher 22. The straps 44 and 45 are used for immobilizing the head, for example, by fixing one of the straps 44, 45 around the head support portion 26 of the stretcher 22 and behind the ears of the mouse and by fixing the other of the straps 44, 45 around the head support portion 26, proximal the nose of the mouse. If desired, other portions of the mouse are restrained using similar straps 44. Clearly, the straps 44, 45 are sized to fit around the stretcher 22 and around the subject mouse.

It will be understood that the use of the apparatus 20 of the present embodiment and the method of manufacture of this device is similar to the use and method of manufacture of the first described embodiment.

Reference is now made to FIGS. 11 to 13 to describe an animal positioning apparatus 20 according to still another embodiment of the present invention. The animal positioning apparatus 20 according to the present embodiment is similar to the animal positioning apparatus 20 of the second above described embodiment and therefore need not be described in detail again. In the present embodiment, however, a pneumatic respiratory sensor 68 is fixed to the main body support portion 24 for monitoring the respiration of the subject mouse when the mouse is located on the stretcher 22. A wire extends from the pneumatic respiratory sensor 68, toward the end connecting portion 36, through a passage in the stretcher 22 and to a sensor connector 70 adjacent the pin connector 42.

Specific embodiments of the present invention have been shown and described herein. However, modifications and variations to these embodiments are possible. For example, the form and shape of the forward limb directing means 28 and the rear limb directing means 30 can differ. Other probes may be used or alternative probe locations are possible. For example, rather than using a thermocouple as described above, a thermistor can be used for measuring temperature. Also, the present invention is not limited to use in magnetic resonance imaging and can be used for other imaging modalities and other research. Rather than inserting the stretcher 22 into a common centrifuge tube, other suitable containers or holders are possible. For example, the stretcher 22 can be mounted to a suitable platform rather than inserted into a container. This is particularly useful in, for example, ultrasound and CT imaging. Still other modifications and variations may occur to those skilled in the art. All such modifications and variations are believed to be within the sphere and scope of the present invention.

What is claimed is:

1. A small animal positioning apparatus comprising:
    a support stretcher having a main body support portion, a head support portion fixed to a first end of the main support portion, forward limb directing means proximal the first end of the main body support portion, and rear limb directing means proximal a second end of the main body support portion;
    said forward limb directing means comprising a pair of slots in said support stretcher between the head support portion and the main body support portion, configured to receive and conform to the forward limbs of the small animal; and
    at least one probe disposed on at least one of the main body support portion and the head support portion, for physiological measurement of the animal.

2. The small animal positioning apparatus according to claim 1, wherein said at least one probe includes a pair of electrocardiogram pads disposed on at least one of the main body support portion and the head support portion.

3. The small animal positioning apparatus according to claim 1, wherein said at least one probe includes at least one of a thermocouple and a thermistor disposed on the body support portion of the support stretcher.

4. The small animal positioning apparatus according to claim 1, wherein said rear limb directing means comprises a pair of rear limb directing recesses at the second end of the main body support portion, configured to receive and conform to the rear limbs of the small animal.

5. The small animal positioning apparatus according to claim 1, further comprising a connecting portion fixed to the support stretcher, the connecting portion electrically connected to at least one probe for providing a connection point for said at least one probe.

6. A small animal positioning apparatus comprising:
    a support stretcher having a main body support portion, a head support portion fixed to a first end of the main support portion, forward limb directing means proximal the first end of the main body support portion, and rear limb directing means proximal a second end of the main body support portion;
    said rear limb directing means comprises a pair of rear limb directing recesses at the second end of the main body support portion, configured to receive and conform to the rear limbs of the small animal; and
    at least one probe disposed on at least one of the main body support portion and the head support portion, for physiological measurement of the animal.

7. The small animal positioning apparatus according to claim 6, wherein said at least one probe includes a pair of electrocardiogram pads disposed on at least one of the main body support portion and the head support portion.

8. The small animal positioning apparatus according to claim 6, wherein said at least one probe includes at least one of a thermocouple and a thermistor disposed on the body support portion of the support stretcher.

9. The small animal positioning apparatus according to claim 6, further comprising a connecting portion fixed to the support stretcher, the connecting portion electrically connected to at least one probe for providing a connection point for said at least one probe.

* * * * *